June 6, 1972  F. J. CIMPRICH  3,667,881
TIRE COOLING
Original Filed July 31, 1967  4 Sheets-Sheet 2

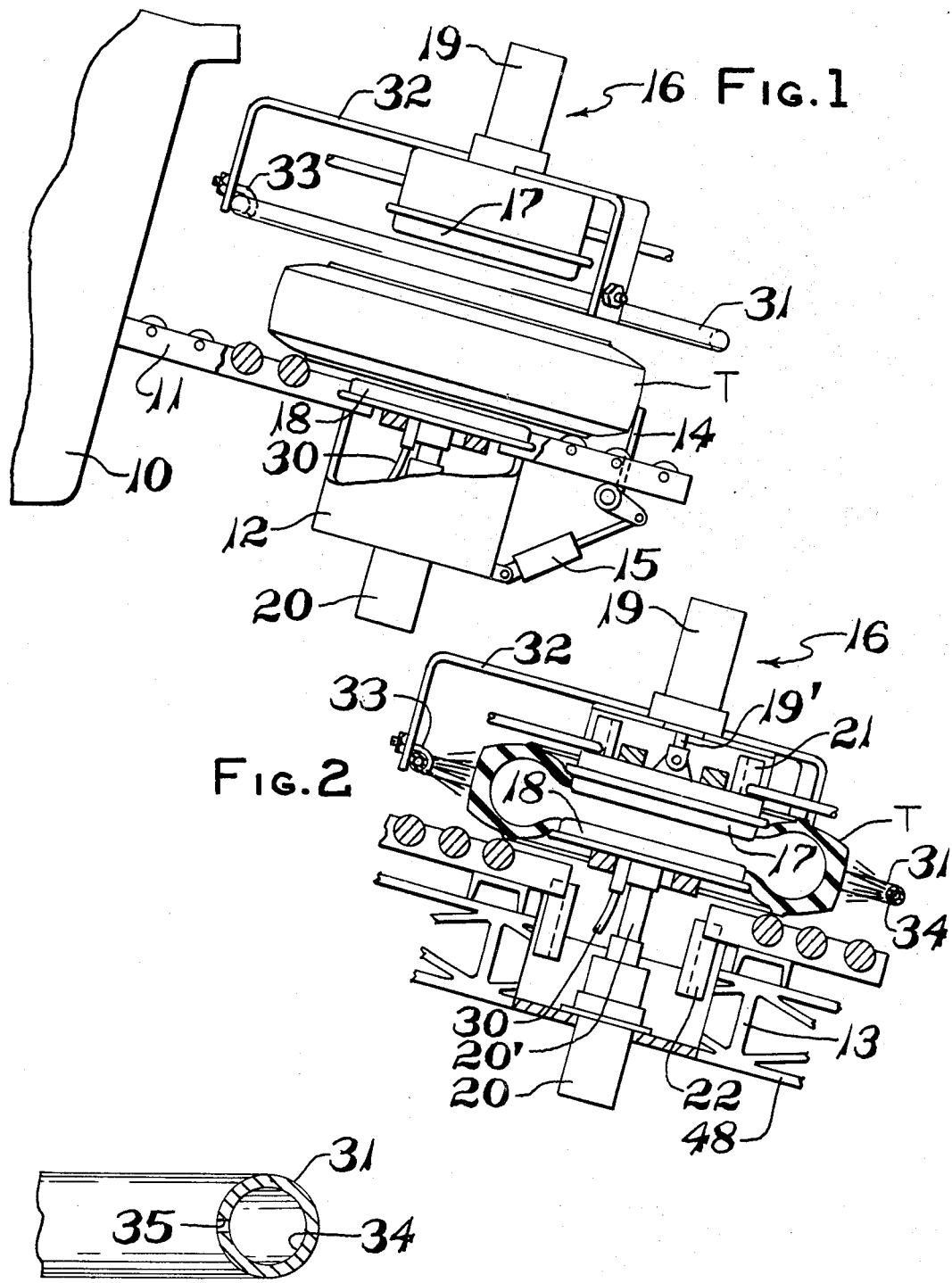

INVENTOR.
FRANCIS J. CIMPRICH
BY Joseph Januszkiewicz
ATTY.

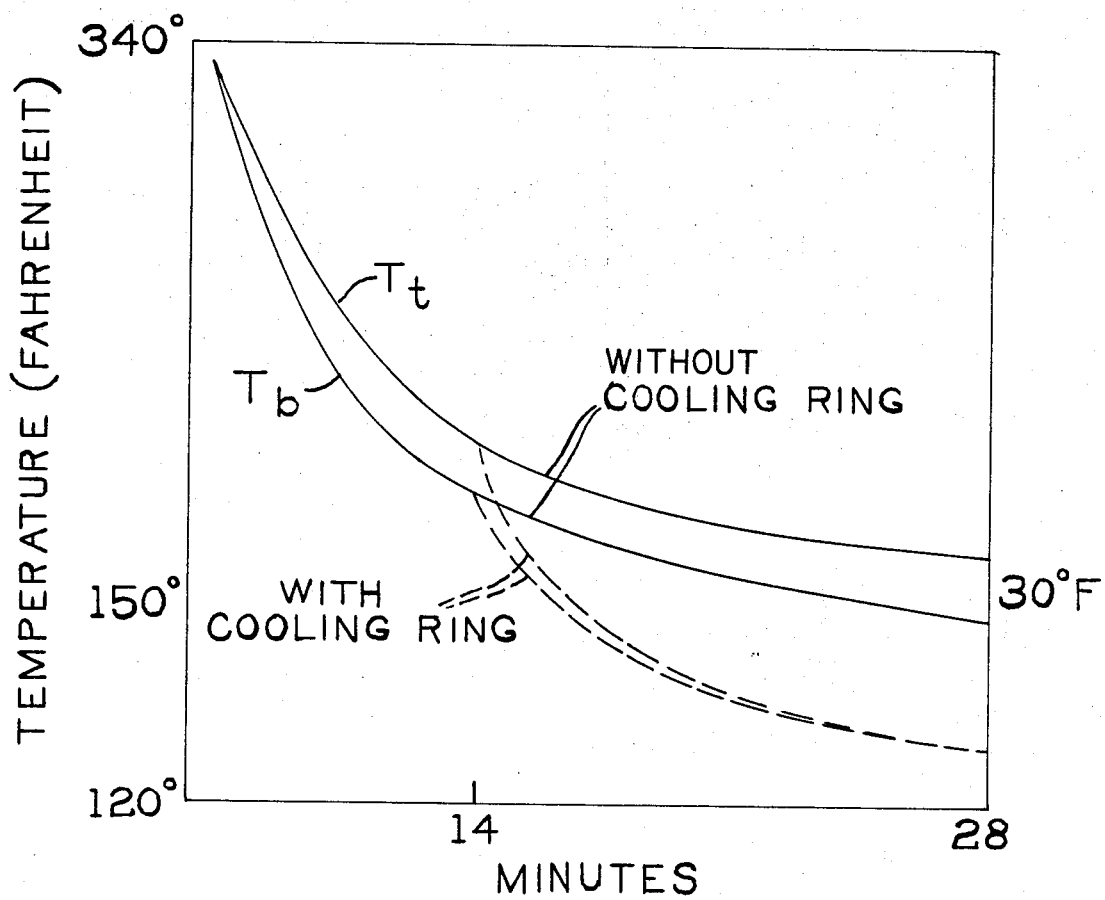

United States Patent Office 3,667,881
Patented June 6, 1972

3,667,881
TIRE COOLING
Francis J. Cimprich, Canton, Ohio, assignor to The B. F. Goodrich Company, New York, N.Y.
Continuation of application Ser. No. 660,162, July 31, 1967, which is a continuation-in-part of abandoned application Ser. No. 623,415, Mar. 15, 1967. This application Mar. 3, 1971, Ser. No. 120,700
Int. Cl. B29h 5/02, 17/00
U.S. Cl. 425—28                               7 Claims

ABSTRACT OF THE DISCLOSURE

Post cure inflation tire apparatus having a ring which circumferentially encompasses the tire which is subject to being held by a pair of axially spaced movable rim flanges wherein the ring directs coolant against the periphery of such tire to cool such tire to a uniform temperature.

CROSS REFERENCE TO RELATED APPLICATIONS

This application is a continuation of applicant's United States patent application Ser. No. 660,162 filed July 31, 1967 now abandoned, which is a continuation-in-part of applicant's patent application Ser. No. 623,415 filed Mar. 15, 1967, now abandoned, claiming apparatus for treating vulcanized tires.

BACKGROUND OF THE INVENTION

This invention relates to treating of vulcanized tire and more particularly to post cure inflating of tires.

In the manufacture of tires, the tire carcass is placed in a molding machine or vulcanizer wherein the carcass is subjected to heat and pressurization to cure or vulcanize the tire. Tires, whose body plies are made of nylon cords, polyester or synthetic filaments having properties similar to those when taken out of the molding machine will shrink. If measures are not taken to minimize such shrinkage, the tread rubber will crack in service from the stresses placed on it.

In order to overcome this condition it has been the practice to inflate synthetic filament tires, examples of which are polyester and nylon tires, immediately after they are discharged from the molding machine and hold them in the inflated condition at adequate pressures until the tires have cooled down to a point where shrinkage of the nylon cords is minimized when the tires are deflated. As an example of this, passenger car tires are vulcanized at temperatures in excess of 300° F. and as such tires come out of the molding machine or vulcanizer, the hot tire is inflated to approximately 50 p.s.i. internal pressure and held under pressure until the tire cools to approximately 200° F. This practice in the art is called post cure inflation.

It has been the practice to insert an expansible rubber tube into the tire, mount the tire between a pair of flanges and then inflate the tube to attain the desired shape for cooling. Others proposed to mount the tire between a pair of flanges, inflate the tire and then spray the tire with water to effect cooling. Another apparatus utilizes the device known as the Bag-o-Matic vulcanizer from which type the tires are normally removed without a cooling period wherein the vulcanizing fluid is exhausted from the jacket of such vulcanizer and a cooling fluid is circulated therethrough to effect post cure inflation. Such cooling is time consuming, inefficient and expensive. In the use of the rubber tube, the process involves costly labor, is cumbersome, time consuming and inefficient. In addition, the tubes are difficult to insert into the tires when the tires are hot. The various steps of the procedures described above have involved excessive labor resulting in higher costs for the tires. Although such problems have been recognized in the industry, they have been tolerated in the absence of a better procedure for shaping such tires.

SUMMARY OF THE INVENTION

The general purpose of this invention is to provide novel apparatus which embraces all the advantages of the similarly employed devices while possessing none of the aforedescribed disadvantages and in addition thereto has provided an unusual result of a marked improvement in tire uniformity. Such invention provides a post cure inflation treatment of vulcanized nylon and polyester tires which cools the tire as by an air stream to a uniform temperature providing uniformity of quality throughout the tire with a higher percentage of acceptability when measured for force variation. Tires with thermoplastic cord have a non-uniformity which occurs from two sources: (1) Mechanical non-uniformity due to imperfections in the building and general processing of a tire as in variations in materials, splicing, defects in rubber, etc. and (2) heat induced non-uniformity due to uneven cooling of the tire after cure.

In testing and grading of tires for acceptability, one system utilizes a machine which applies a 1000 pound force and measures radial force variation from a preselected force. Such force variation measured is due to mechanical and heat induced non-uniformity. Whereas heat induced non-uniformity is temporary in nature, the mechanical non-uniformity is permanent in nature therefore with the coupling of these two non-uniformities it prohibits the proper grading and testing of tires. Such uniformities determine the ride characteristics of a tire. Depending on the phasing of these uniformities the ride characteristics of a tire may be improved or worsened due to heating from normal tire service operation.

Test results have indicated that such invention reduces considerably tread groove cracking in tires. This is because the invention not only allows uniform cooling but a faster cooling than if the tire is allowed to cool, if it stood in ambient air so that the tires are discharged from the post cure inflator at lower temperatures with less shrinkage occurring and therefore growing less in service. By reducing the service growth, tread groove cracking is reduced. In addition, the cost of utilizing the air stream of the present invention which entrains surrounding air to cool the tires is inexpensive particularly when compared with the quality of tires produced by such invention. Although the coolant described is directed to air, other types of coolants are contemplated. Further advantages of the present invention are the inexpensiveness to build and install such post cure inflation equipment existing post cure inflation equipment existing post cure inflation units yielding a low release temperature of the tire which it is found to be desirable while cooling the tie uniformly around its circumference further enhancing the uniformity of construction in the tire, assuring full growth thereof to a consistent size. Thus such invention is used as a tool to control tire growth thereby giving uniformity of final tire size. Such invention cools the tire uniformly independently of the tire orientation whether the tire is in the vertical plane horizontal plane, or in an inclined plane. It is further possible to cool the tire uniformly to a final release controlled temperature independent of the ambient conditions so as to obtain the same quality of tire in tire plants in hot as well as cold weather. In addition such invention cools the tires in the post cure inflation cycle to a desirable uniform release temperature given an initial non-uniform temperature distribution as is the case when the tire is allowed to cool in static air before the initiation of the air flow. Such apparatus is versatile in that it is adaptable for tires of various sizes and types. Such invention is adaptable to the processing of all types of tires.

The present invention contemplates the use of a single hollow ring which encompasses the tire in its post cure inflated condition whereby a flow of controlled coolant flows through the ring through the plurality of bores on the inner periphery of the ring creating low pressure areas which enhances the entrainment of the surrounding air by up to fifty percent volume and thence such coolant with entrained air flows towards the center of the tire causing a scrubbing action over the exterior tread and sidewalls of the vulcanized tire causing a cooling which is even, controlled, and uniform around the tire.

BRIEF DESCRIPTION OF THE DRAWINGS

FIG. 1 is a fragmentary side elevation view of another of the post cure inflation apparatus.

FIG. 2 is a fragmentary view with portion thereof shown in cross section of the post cure inflation ring in operation.

FIG. 4 is a fragmentary cross sectional view of the post cure inflation ring.

FIG. 7 is a chart comparing a tire's temperature with and without the use of a cooling ring.

DETAILED DESCRIPTION

Figure 5:
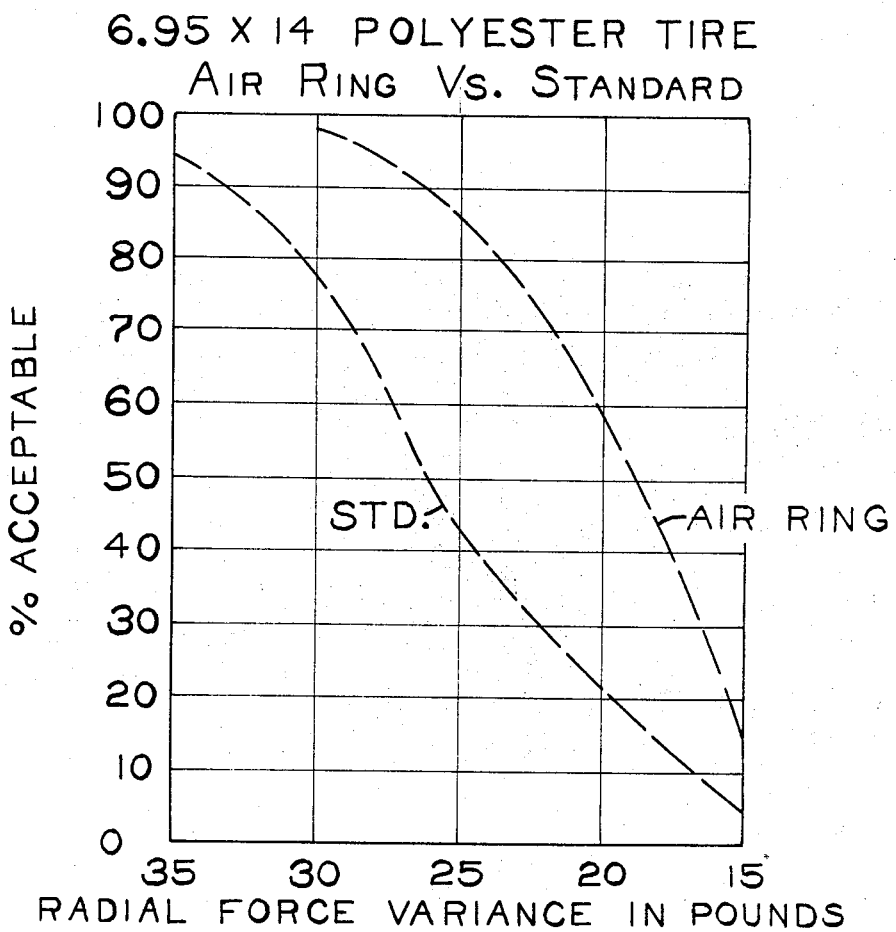
FIG. 5 is a chart comparing the use of a ring in the post cure inflation of tires compared with the standard procedure without such a ring.
Figure 3:
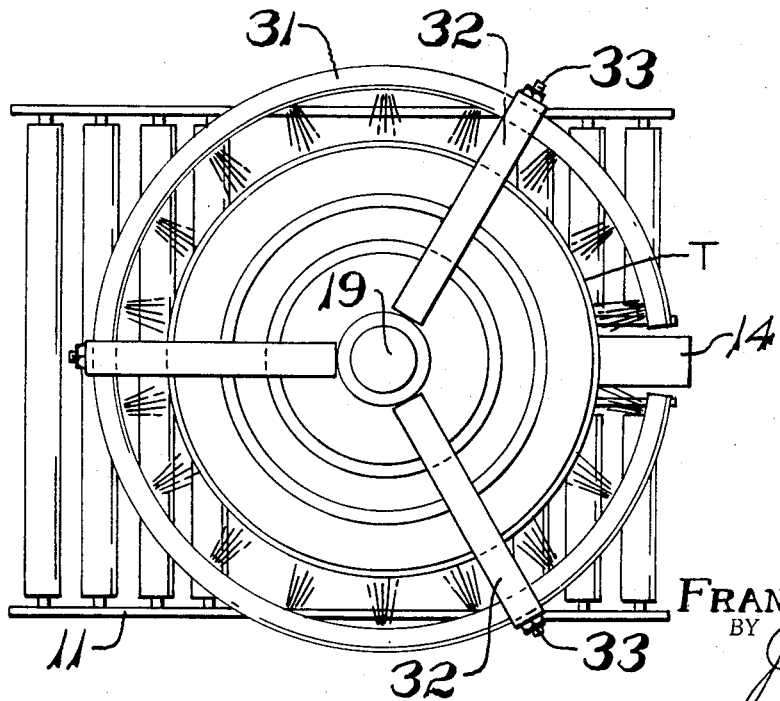
FIG. 3 is a plan view with parts broken away of the inflation stand.

The tire curing press 10, a portion only of which is shown, may be any conventional automatic press for shaping and vulcanizing pneumatic tires from the green tire carcass into a cured tire. Prior United States Patent 2,808,618 is a typical example of such a press. Such press 10 discharges tires T onto an inclined conveyor 11, which conveyor 11 is supported by a fixed frame support 12 and a bridge structure 13, shown only in FIG. 2. The tires T roll down the conveyor 11 until they abuttingly engage the stop 14. Stop 14 is a pivotal stop operated by a pneumatic cylinder 15 for a purpose to be described.

A tire inflating mechanism referred to generally by numeral 16 is supported upon the bridge structure 13. Tire inflating mechanism 16 is provided with a pair of rim flanges 17 and 18 (or other holding means), which flanges 17 and 18 are reciprocated toward and away from each other by cylinders 19 and 20 within the guide tracks 21 and 22 from the position shown in FIG. 1 to the position shown in FIG. 2. Cylinders 19 and 20 have their respective pistons connected to rim flanges 17 and 18 via rods 19' and 20' respectively. When the tire has engaged the stop 14 a suitable limit switch, not shown, is actuated to provide the controlled pressurization of the head end of cylinders 19 and 20 to move rim flanges 17 and 18 toward each other and against the beads of the tire. Control means are provided to direct pressurized air into the chamber defined by the tire carcass and the rim flanges 17 and 18 via a conduit 30 from a suitable source. Upon inflation of the tire to a pressure of approximately 50 p.s.i., as in the case of passenger tires or to approximately twice the running pressure for any tire, the pressure fluid is temporarily cut off and a suitable timing switch is actuated to open a valve to conduct conditioned pressurized air to a ring 31 for a purpose to be described. While pressurized air is moved through ring 31 suitable automatic control means are provided to maintain the preselected desired pressure in the tire which in the example given is 50 p.s.i. Upper rim flange 17 has a plurality of radially extending arm members 32 with depending arm portions whose outer end portions cooperate with a clamp 33 to securely fasten and locate a hollow ring 31 relative to the tire T. Ring 31 encompasses tire T for the entire circumference thereof except for a small portion adjacent stop 14 thereby facilitating the raising and lowering of the ring 31 and rim flange 17 relative to the conveyor. It is contemplated to provide a ring 31 that completely encircles the tire T, cooperating with a stop that is retractable upon engagement of the rim flange 18 with the tire to locate and hold the tire on the conveyor 11.

Ring 31 has a passageway 34 that extends for the entire length thereof, which passageway 34 communicates with a plurality of circumferentially spaced bores 35 on the inner periphery direct pressurized air radially toward the center of the ring. As the air leaves the respective bores 35, it creates a low pressure zone immediately surrounding such bores, such that the pressurized air from bores 35 entrain the surrounding moving air to augment the air coming from ring 31 whereby 50% of the air used in cooling the tire comes from the surrounding atmosphere of bores 35.

Although the invention has been illustrated and described with the ring substantially a complete circle except for the section adjacent to the stop 14, it is within the scope of this invention to have the ring 31 a complete annular unit with suitable stop means cooperating therewith to facilitate the locating of the tire T relative to the movable rim flanges 16 and 17.

In the operation of the apparatus, a tire T is transferred either manually from a molding machine or ejected therefrom onto a conveyor 11 for movement thereon until such tire T engages a stop 14 which actuates a suitable limit switch, not shown, which actuates a control valve which in turn directs pressurized fluid into the head end of cylinders 19 and 20 to move the rim flanges 17 and 18 toward each other until such flanges 17 and 18 engage and seat on the beads of the tire T. The tire T is then inflated to a pressure of approximately 50 p.s.i. (as the case of passenger tires on twice the running pressure in other types of tires) and held at such pressure until the tire T is cooled by jets of air (or fluids, gases or vapor gas mixtures or other suitable types of coolants) that are directed by the bores 35 entraining surrounding air towards the crown of the tire. Such air jets create a scrubbing action over the exterior of the tire tread and over the sidewalls of the vulcanized tire, causing a uniform cooling around the tire. Such cooling of the tire T is achieved by a heat transfer process which is forced convection enabling the cooling of the tire at all portions thereof to be cooled at an even rate regardless of orientation of the tire, i.e., whether the tire is horizontal or vertical or any position of inclination therebetween.

When the tire is cooled on the post cure inflator in ambient air, a natural or free convection occurs as a result of the motion of the fluid due to density changes in the air arising from the cooling process. The movement of the fluid in free convection, whether it is a gas or liquid, results from the buoyancy forces imposed on the fluid when its density in the proximity of the heat transfer surface is decreased as a result of the heating process. Although the tire is exposed to radiation heat transfer from the high temperature presses in the vicinity, the radiation heat transfer effects may be considered less important than the natural convection heat transfer effects for practical purposes.

As a result of the free convection heat transfer process, an unbalanced cooling of the tire occurs, causing temperature gradients in the tire circumferentially and transversely. When the tire is held in the horizontal position, the temperature gradient exists in the transverse direction from shoulder to shoulder across the tire, and there is no temperature gradient circumferentially in any given meridian plane cut through the tire. When the tire is held in the vertical position, the temperature gradient exists circumferentially, and there is no temperature gradient transversely across the tread. For tire positions at some angle of inclination, the temperature gradients occur around the tire circumference and across the tread ranging in various degrees between the two end conditions described above. The temperature differentials resulting from the natural convection process range between 0° to 50° F., and they are the cause of the temperature induced non-uniformities present in tires which are cooled in ambient air in the conventional post cure inflation units. In addition, as a result of the free convection heat transfer process, the tire release temperatures range somewhere within 50° to 100° F. of the ambient temperature. This has an undesirable effect on the tire size as explained hereinafter and it is desirable to approach more closely the ambient temperature, thereby having greater control of the final tire size which is achieved by the instant invention.

Theoretically, the natural convection boundary layer surrounding the tire is destroyed completely, when a stream of gas such as air is made to impinge from ring 31 on the tire surface at supersonic velocities. Turbulent mixing motion takes place at the air-rubber interface and there is violent scrubbing action between the gas or fluid particles in intimate contact with the tire. Turbulent eddy motion in separated flow may be considered as an accurate description of the flow behavior occurring at the tire surface. The mode of heat transfer is turbulent forced convection. The rate of convection cooling can be controlled by the inlet conditions such as pressure and temperature of the air, the number and shape of bores or nozzles, the time interval of air flow, the rate of air flow and ring orientation. The effective orifice pressure range of 30 to 50 p.s.i. delivers 2 to 3 s.c.f.m. to effectively provide for the scrubbing action. The bores 35, as disclosed may accommodate nozzles which provide a finer control over the direction of air flow and to control distribution of air. In addition, to economize on the air rate flow, it is possible to achieve such cooling at low pressure of 1 to 5 p.s.i.g. and high volume air of 45 to 90 s.c.f.m.

Figure 6:
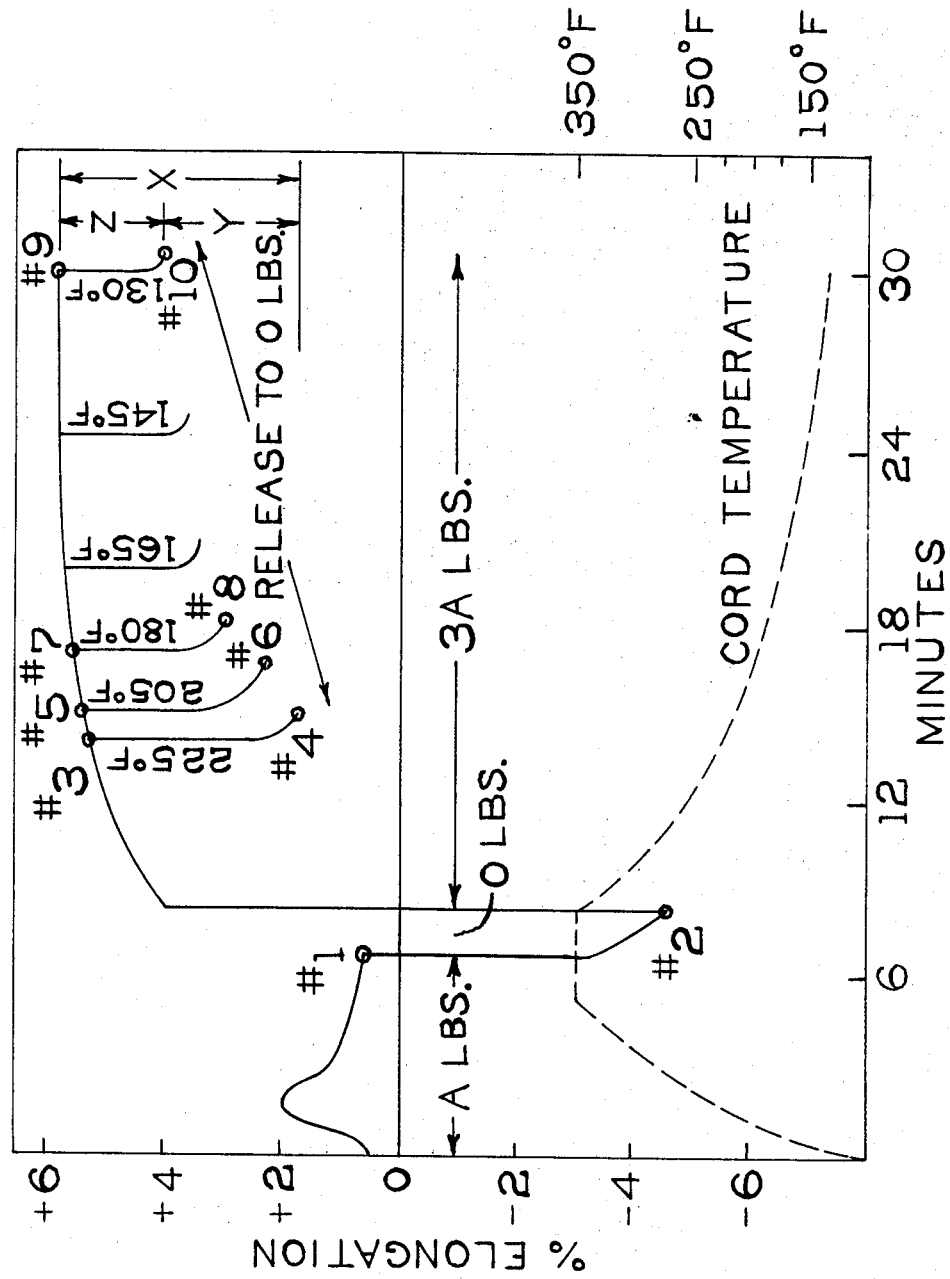
FIG. 6 is a chart indicating simulated cure and post cure inflation.

To illustrate the effectiveness of the uniform cooling as used by this invention reference is made to FIG. 6 which shows the effect of post cure inflation (PCI) release temperature with the percentage of cord elongation plotted versus time, with the dotted line depicting the temperature. Such data is based on a cord simulated cure and post cure inflation test where the specimen was subjected initially to a curing operation of 7 minutes under a load of A pounds. As the cure operation begins, assuming a load which in the case of a tire would be the inflation pressure on the tire in the mold, the cord elongates and then a reversal occurs, caused by the heat shrinkage tension generated by the cord. During such curing there is a 2% elongation in the cord; however, at the end of the curing cycle represented by point No. 1 the cord is approximately .5% elongated. Such end of cure occurs at 7 minutes at approximately 350° F. (temperature of the sample being shown in dotted lines and with the scale on the right hand side of the chart). At the end of the curing cycle there is a 1½ minute interval (from point No. 1 to point No. 2 representing the time the sample is released from the mold to the time the sample is placed into the post cure inflation cycle afterwhich the sample is subjected to a load three times that of the curing load of A pounds. From the time the sample is released after the curing cycle to point No. 2 there is a shrinkage of the cord of over 5½%. As the sample is put under load at point No. 2 the percentage elongation increases sharply while temperature of the sample continues to drop exponentially. Where the sample is held under load from point No. 2 to point No. 9 and then released from load, the temperature is approximately 130° F. and the cord will shrink approximately 2% (point No. 10) giving a certain size tire. The significance of this is that tire has been permitted to grow and cure, so that upon inflation of the tire and in use of service where the tire heats up, the tire cord will expand, but the maximum potential expansion is only approximately 2%. However, where the specimen was at approximately 225° F. (at 14 minutes) and then released (as at point No. 3) from the load representing a high release temperature from the post cure inflator, the cord will shrink such that a tire will have a potential inservice tire growth of 4½%. Where the specimen was held under a load of 3A pounds and allowed to cool in ambient air, (overall time of 15 minutes) and then released as at point No. 5 at approximately 205° F., the cord will shrink and have a potential in service tire growth of 3½% (point No. 6) upon heating up of the tire while in service. Where the sample is held under the load for approximately an additional minute and a half and released from the load as at point No. 7 where the sample has cooled to approximately 180° F., the cord will shrink to a point where there is a potential in-service tire growth of approximately 3%. It will thus be observed that the potential in-service tire growth at high release temperatures is quite large. The distance between points No. 4 and 10 is the difference between distance numbers X and Y which is distance Z, is the difference in cord length between high-temperature and low-temperature post cure inflation release and shows the non-uniformity potential caused by non-uniform temperature around the tire at post cure inflation release. Uniformity here refers primarily to tire radial force variance measured under approximately 1,000 pounds load and one-inch deflection. A variation in cord length of 0.5% could result in up to 50 pounds radial force variance, which would be sufficient to make a tire unacceptable for some tire markets. This distance is an indication of size differences that could be expected to exist between tires, otherwise identical, released from a post cure inflator at a different release temperatures. This is significant in that tires should be allowed to grow to their fullest possible size uniformly; otherwise, it is possible to have two tires of different sizes on the same vehicle. Moreover, with heat induced non-uniformity due to non-uniform cooling of a tire, the cords have different potential in-service expansion thereby giving a non-uniformly constructed tire.

The method of operation utilizing the above principles includes the steps of locating a tire T in the proper position for reception by the rim flanges, inflating such tire for the post cure inflation operation and thence cool the tire to the desired temperature by forced convection wherein the rate of cooling may be controlled as set forth above. Through the use of the above apparatus uniform release temperatures were obtained with no temperature differential across the tire, with the result that the tires were found to be more uniform throughout and met the uniformity standards set by the tire industry.

As a comparison of the results obtained through the use of the post cure inflation ring reference is made to the chart designated as FIG. 5 wherein tires (sizes 6.95 x 14) under test runs, cured under conventional practice and thence mounted on a pair of flanges for the post cure inflation period wherein the tire was held in a vertical position with its axis of rotation in a horizontal plane wherein the tire was allowed to cool in a static atmosphere displayed certain characteristics with respect to radial force variance. In testing a tire for uniformity of construction a tire would be placed between a pair of flanges, inflated and thence subjected to a load. Measurement would be taken or recorded comparing variations in radial force due to tire construction, which variance in radial force determined acceptability. Assuming that a radial force variance 35 pounds was considered acceptable then it determined that approximately 95% of the tires were acceptable. However, as the radial force variation was lowered then of the tires manufactured, a lower percentage were acceptable. Examples of this are shown on the chart wherein at 25 pounds and 20 pounds radial force variance the acceptability rate was approximately 42% and 20% respectively. Under the same conditions of manufacture and curing with the exception that an air ring was used during the post cure inflation period, a direct comparison with the standard procedure as set forth above compares very favorable under the standard procedure, 87% are found to be acceptable when the ring is used. In the case where only 20% were acceptable under the standard procedure, 60% are found to be acceptable under the procedure using an air ring. Although other factors influenced tire uniformity, it was with the adoption and use of the ring that showed the effectiveness of post cure inflation on tire uniformity. This is further illustrated in FIG. 7 wherein the temperature is on the ordinate axis and time on the abscissa axis with line $T_t$ illustrating the progress of the temperature of the top of the tire as compared to the progress of the temperature $T_b$ at the bottom of the tire. This time is related to a passenger tire and its cure time. The time on the scale is time immediately after cure. When the tire comes out of the curing press as in the case of a passenger tire at approximately 340° F., the temperatures $T_t$ and $T_b$ are identical; however, as the tire is cooled under normal conditions of post cure inflation assuming that the tire is in the vertical posture; the upper portion of the tire cools slower than the lower portion of the tire, such that after 28 minutes from release of cure, the differential between $T_t$ and $T_b$ is approximately 30°. This differential in temperature allows greater shrinkage of the cords in the lower portion of the tire than in the upper portion of the tire upon release of the post cure inflation pressure, thereby resulting in tire non-uniformity. With the use of the cooling ring, the differential in temperature between $T_t$ and $T_b$ can be eliminated to remove heat induced tire uniformity, which example is shown in the chart by the dotted lines.

It is contemplated within the scope of the invention to pull a vacuum in the air rings causing a draft of ambient air to flow over the tire and uniformly cool the tire, thereby assuring the elimination of heat induced tire non-uniformity.

It has further been determined as a result of this invention that the technique of obtaining uniform cooling of the tire can be effected other than in the post cure inflator which can be at some time following the cure other than immediately after cure.

I claim:

1. An apparatus for post-cure inflating tires comprising a pair of spaced rim flanges mounted for movement toward and away from each other; means operatively connected to said rim flanges for moving said rim flanges; conduit means mounted adjacent said rim flanges for inflating a tire mounted on said rim flanges; an annular ring mounted on one of said rim flanges for movement therewith; said annular ring lies in a plane that is normal to said axis of rotation of said rim flanges and equidistant from said rim flanges during the cooling of such tires; said annular ring having a plurality of circumferentially spaced discharge openings on the inner periphery to direct a stream of air radially therefrom and entraining surrounding air therewith towards a tire mounted between said rim flanges to effect a scrubbing action and a uniform cooling of the tire, and all of said discharge openings lying in a single row for directing coolant toward the tread of a tire held by said flanges.

2. An apparatus as set forth in claim 1 wherein said annular ring encircles a substantial portion of such tire, said annular ring lies in a plane that bisects a line connecting the axes of said rim flanges, and said annular ring having a nozzle on each of said openings on the inner periphery to direct pressurized air towards the tread of such tire.

3. A apparatus for tires comprising a pair of spaced annular rim flanges, means operatively connected to said rim flanges for moving said rim flanges between a first and second position, said rim flanges in said first position being operative to receive a tire for inflation and cooperative therewith to define a chamber therebetween, each of said rim flanges having a common central axis of rotation, said rim flanges in said first position have a plane perpendicular to said axis of rotation, inflating means operatively connected to one of said rim flanges to selectively provide pressurized air to said chamber, an arcuately-shaped ring with a single narrow passageway therethrough, said ring having a plurality of circumferentially spaced bores all lying in a single row on the inner periphery of said ring connected to said passageway to direct pressurized air radially therefrom toward said axis to cool a tire mounted between said flanges, and all of said bores lying in a single row along said plane.

4. An apparatus as set forth in claim 3 wherein each bore has a nozzle to direct pressurized air from said passageway toward said axis, and each of said nozzles being adjustable to adjust the size of the opening therethrough.

5. An apparatus as set forth in claim 3 wherein said bores have increasingly larger diameters extending along the circumference from the connection of said ring to said source of said air supply means to provide an even controlled distribution of the air stream toward said axis.

6. An apparatus for post-cure inflating tires comprising support means; a pair of spaced rim flanges in axial alignment mounted on said support means; said rim flanges having a central common axis; said rim flanges movable toward and away from each other; means operatively connected to said rim flanges for moving said rim flanges toward and away from each other; an annular hollow air ring mounted on said support for encompassing a tire mounted on said flanges; said air ring lying in a plane that is normal to the said axis and bisecting said axis; and said ring having a plurality of circumferentially spaced bores on the inner periphery thereof with all bores aligned in a single row for directing air jets towards a tire mounted on said rim flanges to effect a cooling of such tire to a uniform release temperature.

7. An apparatus for the post-curing of tires comprising a pair of spaced annular rim flanges, means operatively connected to said rim flanges for moving said rim flanges between a first and second position, said rim flanges in said first position being operative to receive a tire for inflation and cooperative therewith to define a chamber therebetween, said rim flanges having a common central axis of rotation, a plane cooperative with said rim flanges in said first position and wherein said plane is equidistant from said rim flanges and being normal to said central axis, inflating means operatively connected to one of said rim flanges to selectively provide pressurized air to said chamber, a ring encircling said central axis, said ring having a narrow passageway therethrough, a plurality of discharge opening on the inner periphery of said ring, all of said openings lying in a single row for directing pressurized air inwardly toward said axis for entraining surrounding air toward a tire mounted between said rim flanges, and each of said discharge openings having a center which lies solely in said plane which is perpendicular to said central axis.

(References on following page)

References Cited

UNITED STATES PATENTS

| | | | |
|---|---|---|---|
| 2,963,737 | 12/1960 | Soderquist | 18—2 TP |
| 3,008,180 | 11/1961 | Woodhall | 18—2 TP |
| 3,039,839 | 6/1962 | Waters et al. | 18—2 TP UX |
| 3,065,499 | 11/1962 | Brundage et al. | 18—2 TP |
| 3,170,187 | 2/1965 | Brundage | 18—2 TP |

FOREIGN PATENTS

| | | | |
|---|---|---|---|
| 1,160,350 | 8/1969 | Great Britain | 18—2 TP |

J. HOWARD FLINT, JR., Primary Examiner

U.S. Cl. X.R.

425—44, 383, 445